US010970266B2

(12) United States Patent
Bourbonnais et al.

(10) Patent No.: US 10,970,266 B2
(45) Date of Patent: Apr. 6, 2021

(54) ENSURING CONSISTENT REPLICATION OF UPDATES IN DATABASES

(71) Applicant: International Business Machines Corporation, Armonk, NY (US)

(72) Inventors: Serge Bourbonnais, Palo Alto, CA (US); Paul Cadarette, Hemet, CA (US); David A. Clitherow, Bracknell (GB); Michael G. Fitzpatrick, Raleigh, NC (US); Pamela McLean, Raleigh, NC (US); David Petersen, Great Falls, VA (US); John G. Thompson, Tucson, AZ (US); Gregory W. Vance, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 483 days.

(21) Appl. No.: 15/827,296

(22) Filed: Nov. 30, 2017

(65) Prior Publication Data

US 2019/0163776 A1    May 30, 2019

(51) Int. Cl.
*G06F 16/00* (2019.01)
*G06F 16/23* (2019.01)
*G06F 16/27* (2019.01)

(52) U.S. Cl.
CPC ...... *G06F 16/2308* (2019.01); *G06F 16/2358* (2019.01); *G06F 16/2365* (2019.01); *G06F 16/275* (2019.01)

(58) Field of Classification Search
CPC ............... G06F 16/2308; G06F 16/275; G06F 16/2358; G06F 16/2365
(Continued)

(56) References Cited

U.S. PATENT DOCUMENTS 5,261,089 A * 11/1993 Coleman ................. G06F 9/466
6,438,538 B1 * 8/2002 Goldring ........... G06F 16/24556
(Continued)

OTHER PUBLICATIONS

"Dynamic policy based latency management in relational database replication system for differentiated quality of service (QoS)," Disclosed Anonymously, IP.com, IPCOM000169390D, Apr. 14, 2008, 11 pages.
(Continued)

*Primary Examiner* — Monica M Pyo
(74) *Attorney, Agent, or Firm* — Cantor Colburn LLP; William Kinnaman

(57) ABSTRACT

A method includes reading, by a capture engine, log data. The log data can be synchronously hardware-replicated. The log data reflects that an update was started for a database of a first site. The capture engine corresponds to a capture engine of a second site. The method also includes identifying, by the capture engine, the update. The method also includes determining whether the update was committed to the database of the first site. The method also includes replicating, by an apply engine, the update to a database of the second site based on the determining. The update is replicated to the database of the second site based on a determination that the update was committed to the database of the first site. The committed update corresponds to a consistent replication of updates across two or more databases that reside in multiple database management systems.

8 Claims, 6 Drawing Sheets

(58) Field of Classification Search
USPC .......................................................... 707/703
See application file for complete search history.

(56) References Cited

U.S. PATENT DOCUMENTS

| | | | |
|---|---|---|---|
| 6,622,152 B1* | 9/2003 | Sinn | G06F 11/2074 |
| | | | 707/637 |
| 7,672,979 B1* | 3/2010 | Appellof | G06F 11/1435 |
| | | | 707/649 |
| 9,047,108 B1 | 6/2015 | Rajaa et al. | |
| 9,081,842 B1 | 7/2015 | Natanzon et al. | |
| 9,195,702 B2 | 11/2015 | Bourbonnais et al. | |
| 9,280,592 B1 | 3/2016 | Fredinburg et al. | |
| 9,396,244 B2 | 7/2016 | Ngo | |
| 9,465,855 B2 | 10/2016 | Bourbonnais et al. | |
| 9,507,843 B1 | 11/2016 | Madhavarapu et al. | |
| 9,529,883 B2 | 12/2016 | Bourbonnais et al. | |
| 2013/0318221 A1* | 11/2013 | Anaya | G06F 9/505 |
| | | | 709/223 |
| 2015/0058281 A1 | 2/2015 | Bourbonnais et al. | |
| 2015/0058864 A1 | 2/2015 | Bourbonnais et al. | |
| 2015/0112931 A1 | 4/2015 | Bourbonnais et al. | |
| 2015/0113537 A1 | 4/2015 | Bourbonnais et al. | |
| 2015/0254296 A1 | 9/2015 | Bourbonnais et al. | |
| 2016/0171069 A1 | 6/2016 | Bourbonnais et al. | |
| 2016/0173597 A1 | 6/2016 | Bourbonnais et al. | |
| 2016/0210344 A1* | 7/2016 | Bourbonnais | G06F 16/23 |
| 2016/0246867 A1 | 8/2016 | Bourbonnais et al. | |
| 2016/0371160 A1 | 12/2016 | Bourbonnais et al. | |
| 2017/0010922 A1 | 1/2017 | Bourbonnais et al. | |

OTHER PUBLICATIONS

"Method and System for Transaction Failover in Distributed Directories," Disclosed Anonymously, IP.com, IPCOM000191315D, Dec. 29, 2009, 7 pages.

"Redirecting administrative tasks from primary to secondary database (s) in a high availability data replication environment," Disclosed Anonymously, IP.com, IPCOM000225720D, Feb. 28, 2013, 5 pages.

* cited by examiner

ENSURING CONSISTENT REPLICATION OF UPDATES IN DATABASES

BACKGROUND

One or more embodiments relate in general to ensuring consistent replication of updates across two or more databases. More specifically, one or more embodiments relate to ensuring consistent replication of updates across two or more databases that are involved in a transaction which occurred at a source site.

A database is generally considered to be a structured collection of data. The structured collection of data can be organized in accordance with different frameworks, and users can view and access the data within the structured collection by using different reports, views, and queries. A database can be managed by a database management system (DBMS). Users can use a DBMS to perform updates and operations on databases that are managed by different DBMSs.

SUMMARY

According to one or more embodiments, a method includes reading, by a capture engine, log data of a DBMS. The log data includes a hardware-replicated set of log data. The log data reflects that an update was started for a database of a first site, and the capture engine corresponds to a capture engine of a second site. The method also includes identifying, by the capture engine, the update. The method also includes determining whether the update was committed to the database of the first site. The method also includes replicating, by an apply engine, the update to a database of the second site based on the determining. The update is replicated to the database of the second site based on a determination that the update was committed to the database of the first site. The committed update corresponds to a consistent replication of updates across two or more databases that can be managed by different DBMSs.

According to one or more embodiments, a computer system includes a memory. The computer system includes a processor system communicatively coupled to the memory. The processor system is configured to perform a method including reading log data. The log data includes a hardware-replicated set of log data. The log data reflects that an update was started for a database of a first site, and the processor system corresponds to a processor system of a second site. The method also includes identifying the update. The method also includes determining whether the update was committed to the database of the first site. The method also includes replicating the update to a database of the second site based on the determining. The update is replicated to the database of the second site based on a determination that the update was committed to the database of the first site. The committed update corresponds to a consistent replication of updates across two or more databases.

According to one or more embodiments, a computer program product includes a computer-readable storage medium having program instructions embodied therewith. The computer-readable storage medium is not a transitory signal per se, the program instructions readable by a processor system to cause the processor system to perform a method including reading, by a capture engine, log data. The log data includes a hardware-replicated set of log data. The log data reflects an update for a database of a first site, and the capture engine corresponds to a capture engine of a second site. The method also includes identifying, by the capture engine, the update. The method also includes determining whether the update was committed to the database of the first site. The method also includes replicating, by an apply engine, the update to a database of the second site based on the determining. The update is replicated to the database of the second site based on a determination that the update was committed to the database of the first site. The committed update corresponds to a consistent replication of updates across two or more databases.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
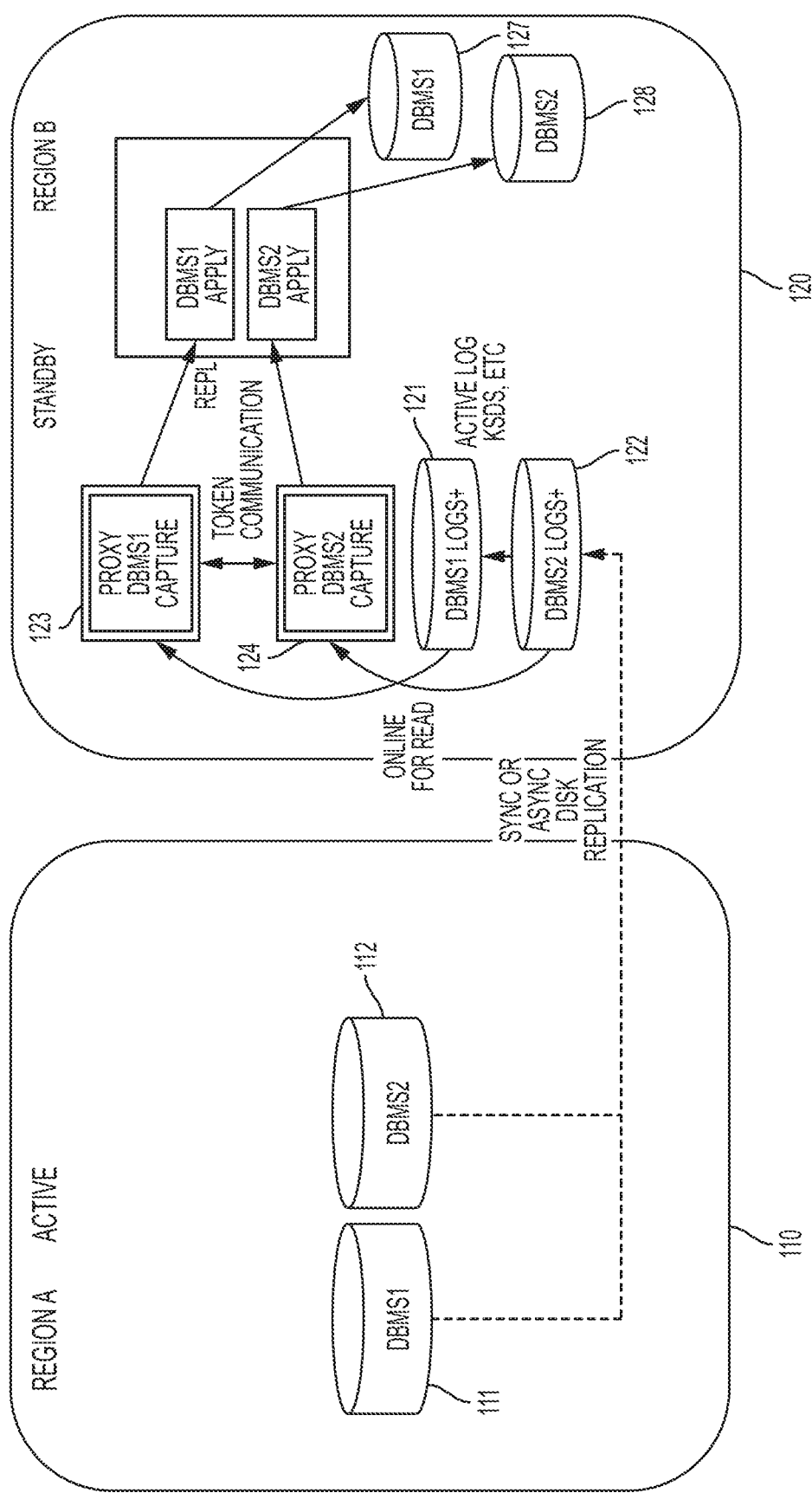
FIG. 1 illustrates a system with an active site and a standby site, where each site includes multiple databases, in accordance with one or more embodiments.

In accordance with one or more embodiments, methods and computer program products for ensuring consistent replication of updates in databases are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

In certain computing systems, a DBMS can implement updates to different databases. The DBMS manages data, including databases. The updates can be changes to the data that is stored within each of the different databases. An update can correspond to any change to data that resides in a database and can be managed by a DBMS, and the update can be logged for recovery purposes. With one or more embodiments, one or more replication engines can make the same changes across each database of a plurality of databases. One or more replication engines can initiate "replication" of updates across the plurality of databases if the DBMS implements the same updates across each of the databases. The DBMS can use certain modules/devices to replicate the updates across the databases. One example module/device is a replication engine that can replicate the updates across the databases.

A user can store information across a plurality of sites, where each site includes at least one database, and where the information of each site is intended to be replicated to each of the other sites. A site that is currently accessed/used by the user can be referred to as an "active site" of the user. A different site that is not currently accessed/used by the user can be referred to as a "standby site" of the user. The user can switch from an active site to a standby site at the direction of the user, for example. In another example, the user can switch from the active site to the standby site when a failure occurs at the active site.

Because the stored database information should be consistently stored across the plurality of databases/sites, any updates which are to be applied to a database of the active site also need to be replicated within the databases of the standby sites. The first database at which the updates occur can be referred to as a source database at a source site. DBMSs need to ensure that applied updates are consistently replicated within the databases of the different standby sites to which the user can switch to.

The DBMS replication engines need to ensure that applied updates are consistently replicated across different databases of different sites, regardless of whether the different databases are heterogeneous or homogeneous across the different sites. The databases across the different sites are considered to be heterogeneous if the databases are of different data models. The databases across the different sites are considered to be homogeneous if the databases are of the same data model.

When each replication engine updates a database, each update/replication can be performed within the database without regard to the other updates/replications that need to be performed on the other databases. Each replication engine can perform one or more updates as a part of a transaction. A transaction that updates more than one databases in the same commit scope, where the databases are managed by two different DBMSs, can be referred to as a global transaction. A transaction can modify data (and databases) that are managed by different DBMSs. Each DBMS can have its own recovery log, which is thus independent of other DBMSs.

Because each update can be replicated within a database without regard to other updates that are to be replicated within other databases at other sites, the possibility arises where certain updates are replicated at one database/site while not being properly replicated at another database/site. If a replication engine replicates updates to one database/site while not replicating updates to another database/site, then this inconsistent replication can result in inconsistencies within the data across the different databases/sites.

In view of the above, when updates are performed at a database/site without regard to the other updates that need to be replicated at other databases/sites, and where the updates can have different commit times, there is a need to ensure that the updates are replicated consistently across the different databases/sites. The commit time of an update can refer to the point in time where the update is applied to the corresponding database.

In order for a replication engine to confirm that an update of a transaction is consistently applied, where the transaction can possibly apply updates to more than one database, the replication engine generally needs to be able to determine all of the following information:
(1) whether the update is involved in a global transaction;
(2) whether other database(s) is/are involved in the global transaction; and
(3) whether other replication engines of the other database(s) have received and have committed/applied the update for the global transaction at the source site.

In view of the above, one or more embodiments are directed to ensuring consistency when global transactions are performed at each database/site to which updates are to be replicated. As such, when a user performs a workload switch from an active site to a standby site, the user can be assured that the updates have been properly replicated at the standby site.

In view of the difficulties described above, one or more embodiments are directed to a method for performing consistent replication of updates across different databases/sites. With one or more embodiments, replication engines can read a set of log data and/or associated metadata in order to determine whether an update of a transaction should be applied/committed. As described in more detail below, the set of log data can be a time-consistent, hardware-replicated set of log data, for example.

By reading from the set of log data and/or associated metadata, one or more embodiments can determine:
(1) whether an update is involved in a global transaction;
(2) whether database(s) is/are involved in the global transaction; and
(3) whether other replication engines of the other database(s) have received and have committed/applied the update for the global transaction at the source site.

With one or more embodiments, when an update is in the process of being applied to a database, information regarding the update process is recorded by the replication engine within corresponding logs. For example, when the process of updating the database begins, the database management system of the database can log an indication that a unit of work has begun within the corresponding log data. This corresponding log data can be data that is hardware-mirrored such that all the update processes to a database (up to a specific point in time) are reflected in the log data.

Replication engines can interrogate/derive information from the log data (which reflect committed units of work which were logged by a corresponding database management system). The log data reflects all the update processes (to one or more databases) up to a point in time. By interrogating the log data, a replication engine can identify recovery tokens. A recovery token can be a data element that includes information that is used to perform a database update and/or that reflects that the database update has occurred. The replication engine can communicate the tokens among the other replication engines so that each replication engine can identify whether other replication engines are involved in the same transaction. For example, based on interrogating/deriving information from the log data, each replication engine can determine whether other databases are involved in a global transaction.

With one or more embodiments, the replication engine can include a capture engine and an apply engine. The capture engine and the apply engine can both be implemented at a standby site (i.e., a site that has not yet been switched to by the user). Another embodiment can be directed to a replication engine that is a single engine that not only performs the log reading function but also applies updates to databases at the standby site.

FIG. 1 illustrates a system with an active site 110 and a standby site 120, where each site includes multiple databases (111, 112, 127, and 128), in accordance with one or more embodiments. Referring to FIG. 1, a capture engine 123 (of a replication engine) can read log data 121 to coordinate and to ensure eventual consistency of updates between database 111 and database 127, where the updates are supposed to be consistently applied by a global transaction. The log data of database 111 and database 112 can be hardware-replicated and stored as log data 121 and log data 122, respectively. The hardware-replication can be accomplished using synchronous or asynchronous disk replication, for example. In FIG. 1, another capture engine 124 can read log data 122 to coordinate and to ensure eventual consistency of updates between database 112 and database 128. With one or more embodiments, the replication engines can read from a time-consistent, hardware-replicated set of log data (121 and 122) and associated metadata. As discussed above, the log data can be a set of log data that has been hardware-mirrored (between the active site 110 and the standby site 120) such that the updates up to a specific point in time are reflected within the log data.

As a result of interrogating the log data, a replication engine can find recovery tokens and can communicate the tokens among the other replication engines so that each replication engine can identify whether other replication engines are involved in the same transaction. As such, one or more embodiments enable the replication engines to determine: (1) whether an update is involved in a global transaction; and (2) whether other databases is/are involved in the global transaction.

As described above, updates can be applied to one or more databases by a global transaction. Performing updates to a plurality of different databases with certain types of global transactions can result in inconsistencies across the relevant databases/sites. One example of a type of transaction that can result in inconsistencies is a transaction that uses a two-phase commit (2PC) protocol/process.

Figure 2:
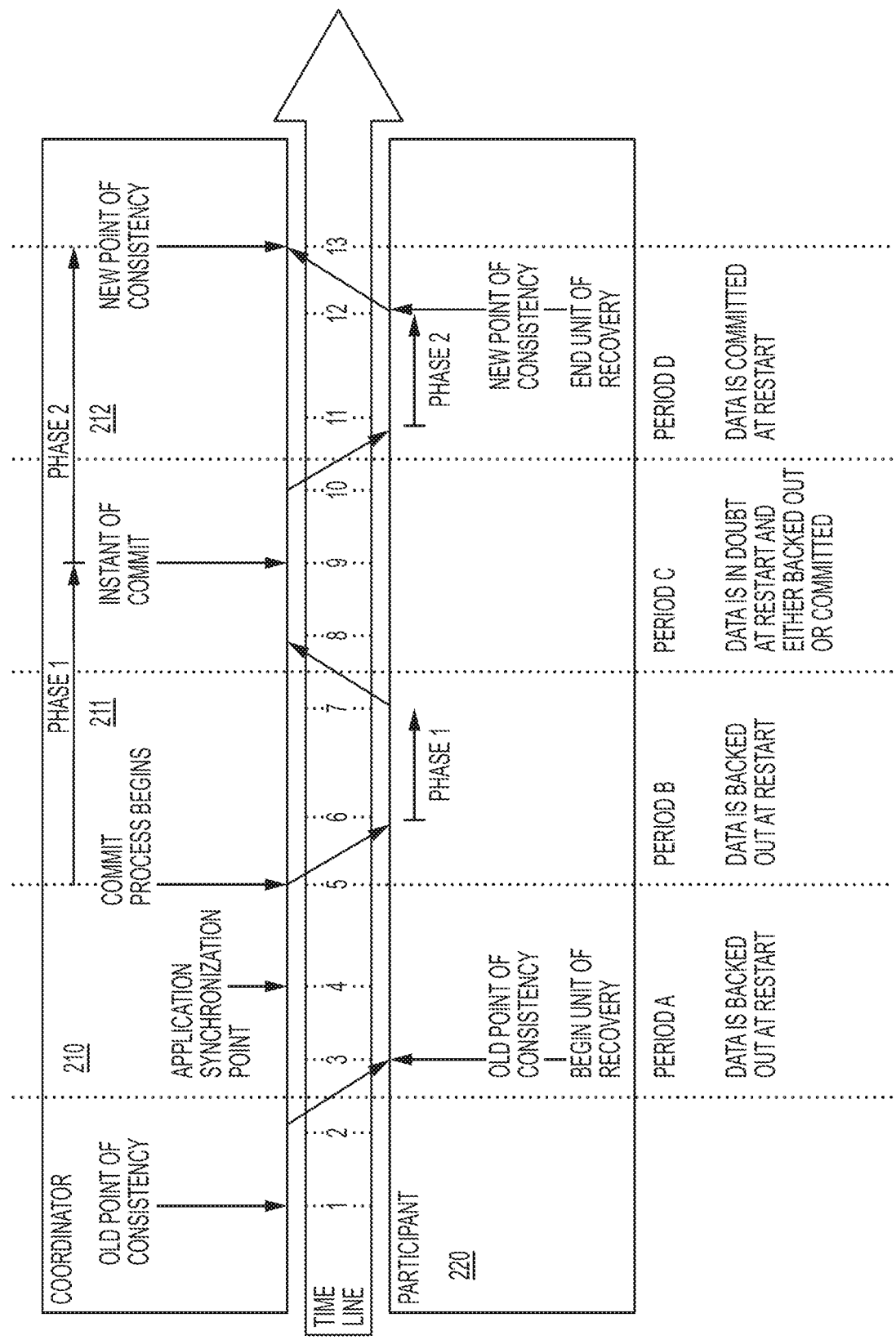
FIG. 2 illustrates a transaction with a two-phase commit process in accordance with one or more embodiments.

FIG. 2 illustrates a transaction with a two-phase commit process in accordance with one or more embodiments. Transactions that use a two-phase commit process can include a first phase 211 and a second phase 212. In the first phase 211, a coordinator 210 of the transmission will transmit a request to update the databases toward each database that is to be updated (i.e., "commit process begins"). Each database to be updated can be considered to be a participant 220. In one or more embodiments, the coordinator 210 can be a database management system and/or an external commit coordinator. In other embodiments, the coordinator 210 can be a different module and/or entity. Upon receiving the request to update, each participant database 220 will then transmit a response to the coordinator 210 regarding whether each database agrees to commit to the update, and thus phase 1 ends (i.e., "instant of commit").

Once the coordinator 210 determines that all participant databases 220 have agreed to commit to the update, the coordinator 210 can then begin the second phase. The coordinator 210 can then transmit and commit each update for each participant database 220 (i.e., "data is committed at restart"). However, as the coordinator 210 transmits the update to each participant database 220, a failure can occur. Any failure that occurs can result in inconsistencies across the databases, as described in more detail below.

Figure 3:
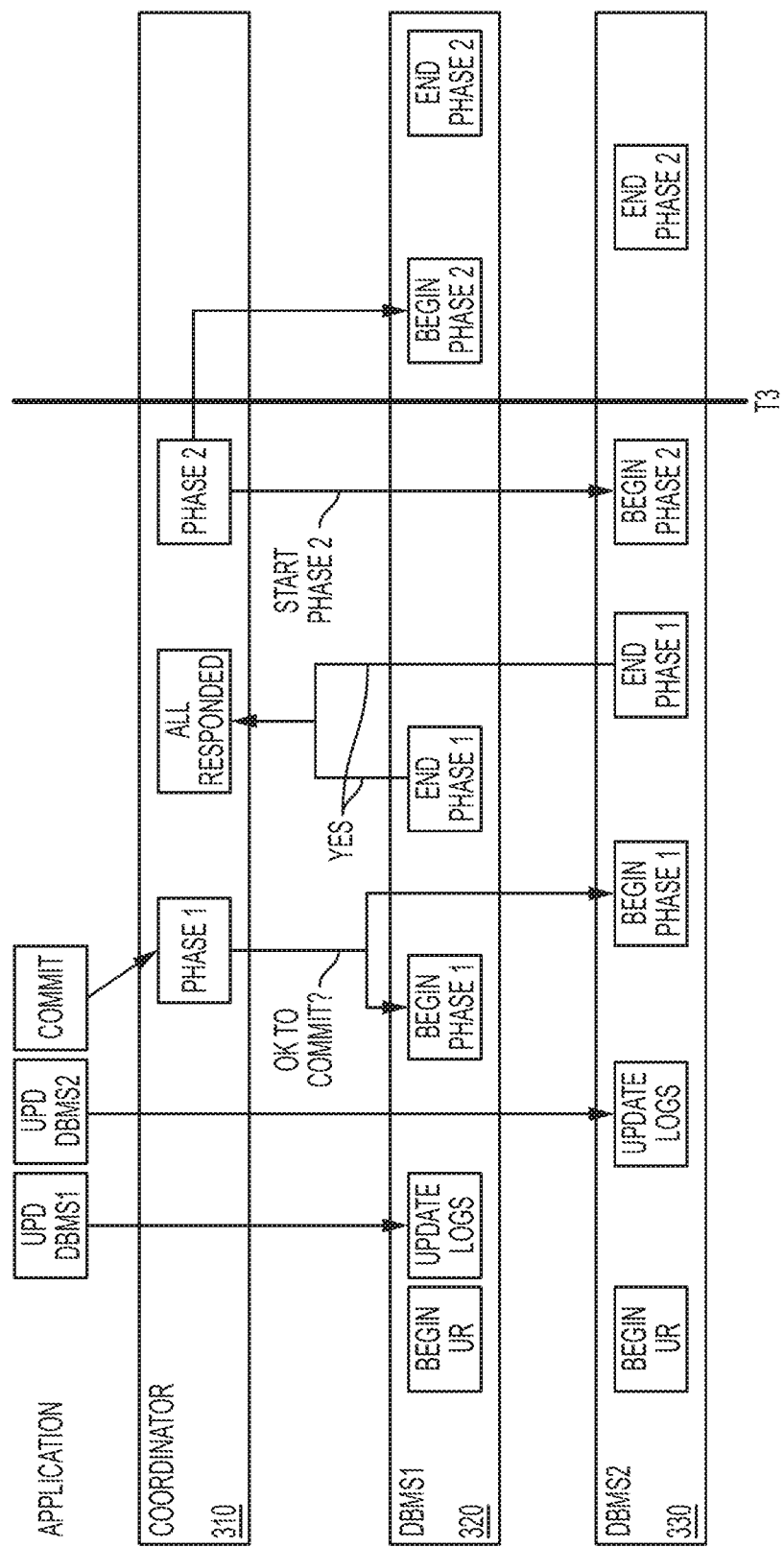
FIG. 3 illustrates an example failure in accordance with one or more embodiments.

FIG. 3 illustrates an example failure in accordance with one or more embodiments. Referring to the example of FIG. 3, a coordinator 310 intends to update a participant database 320 (referred to as database of "DBMS1") and a participant database 330 (referred to as database of "DBMS2") via an update process. However, before the coordinator 310 is able to successfully communicate "start phase 2" to DBMS 1 in order to update participant database 320, a failure T3 occurs, for example. Therefore, because failure T3 interrupts the successful update of participant database 320, only participant database 330 has been successfully updated. Therefore, the update has been committed within participant database 330 but has not been committed to participant database 320. Therefore, participant database 320 and participant database 330 are thus inconsistent as a result of the timing of failure T3.

When a database is updated by a global transaction, where the global transaction is a transaction with a two-phase commit process, log records will be produced for the various phases of two-phase commit process. With one or more embodiments, a database management system can produce log records that reflect the update process. With other embodiments, log records can be produced by a different module and/or entity.

Specifically, as described above, the start of the two-phase commit process can be recorded. The log can record the start of the update process as a beginning of a unit of work, for example. When the end of the two-phase commit process is performed for a database (i.e., when the update is committed to the database), then the log of the database can also record the end of the unit of work, for example.

As described above, in order for an update to be committed/applied across databases with a two-phase commit process, all the databases have to agree to commit to the update (which occurs during the first phase). The second phase of committing the updates to the databases begins only after all the databases have previously agreed to commit to the update, as described above.

In other words, if the log record of at least one database reflects that an update of a transaction was committed/applied to the database (in accordance with the second phase), then the update was necessarily previously agreed to by all the databases (in accordance with the first phase).

As such, if a replication engine interrogates/reads a log record and the log record reflects that an update was committed by at least one database (in accordance with the second phase), then the replication engine can conclude/determine that all databases involved in the corresponding global transaction had previously agreed to commit to the update (in accordance with the first phase). Therefore, if a replication engine reads the log record and can confirm that at least one database was updated, then the update should be replicated across all other databases which had previously agreed to commit to the update.

In view of the above, one or more embodiments are directed to a method that reads/interrogates log data in order to ensure consistency among databases/sites that are to be updated by a same global transaction (at the target site) after a failure has occurred at the source site. In view of the above, one or more embodiments enable one or more replication engines to ensure that updates are consistently applied across the databases.

With one or more embodiments, replication capture engines that participate in an update can be configured to interrogate each other.

When a user switches from an active site to a standby site, if a capture engine of the standby site determines that (1) updates have been performed by a global transaction, and (2) a log record of a database at the standby site does not include any record of committing the update in the database at the standby site (i.e., there is no phase 2 commit record), then the capture engine can interrogate other capture engines. The interrogating capture engine can interrogate all other capture engines to determine whether any of the other capture engines have any record of committing the update in other databases. In other words, the interrogating capture engine interrogates the other capture engines to determine whether the other capture engines committed the update in their respective databases.

If the interrogating capture engine determines that at least one other capture engine committed the update in another database, then the interrogating capture engine can be assured that the update should be replicated across all other databases which had previously agreed to commit to the update. As such, the interrogating capture engine can replicate the corresponding update in a database which had not yet committed the update.

On the other hand, if no other capture engine has committed the update, then the interrogating capture engine will not replicate the corresponding update in its corresponding database.

Although the above example was directed to a transaction that uses a two-phase commit protocol, other embodiments can implement transactions which use other protocols such as, for example, a "last-agent" protocol. With a "last agent" protocol, each participant database that is to be updated by a global transaction can log some type of commit indication that is guaranteed to be written after all other involved databases have logged all updates related to that global transaction. With a "last-agent protocol," the above-described coordinator can grant commit control to the last participant.

One or more embodiments can keep track of recovery tokens for which updates have been applied. The recovery tokens can be stored for a period of time after the updates of the tokens have been applied by an apply engine.

One or more embodiments can communicate an oldest starting point that is captured among each replication engine so that the other replication engines can remove a completed transaction history which corresponds to a time that occurred after the oldest starting point.

With another embodiment, the other replication engines can re-read their captured data to search for evidence of the same recovery token.

The transactions of one or more embodiments can use a two-phase commit protocol or some other methodology where the involved databases log some type of commit indication that is guaranteed to be written after all other involved databases have logged all updates relating to the transaction.

The transactions of one or more embodiments can use a heartbeat protocol to ensure that a replication can move forward when a source database is inactive. With this embodiment, alerts that provide the status of the replication enable the monitoring of the replication status.

Figure 4:
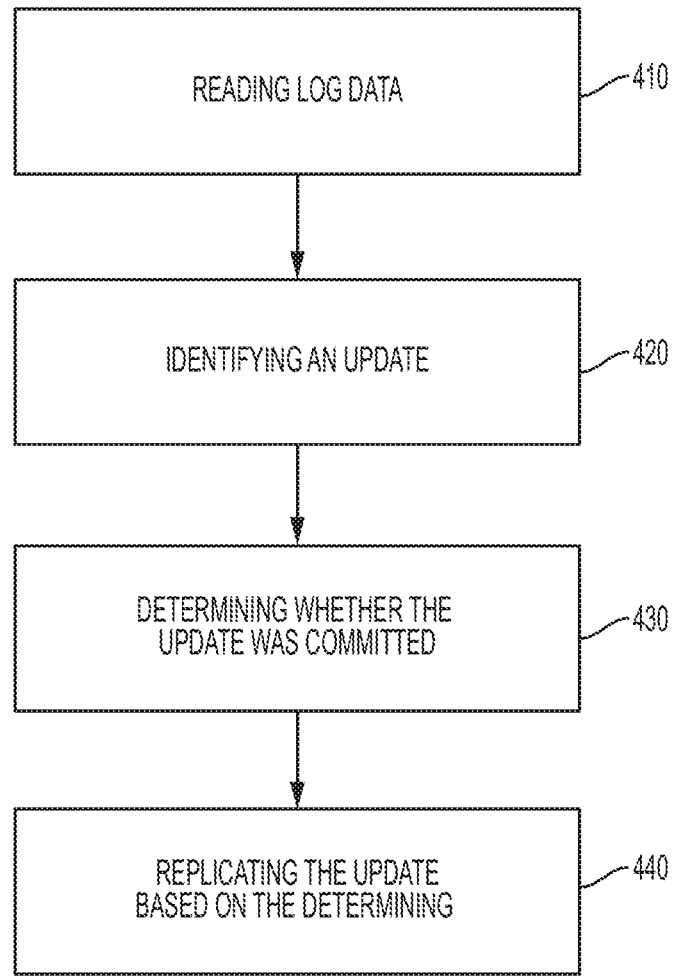
FIG. 4 depicts a flowchart of a method in accordance with one or more embodiments.

FIG. 4 depicts a flowchart of a method in accordance with one or more embodiments. The method can be performed by a replication engine, for example. The method includes, at block 410, reading, by a capture engine, log data. The log data includes a hardware-replicated set of log data. The log data reflects that an update was started for a database of a first site, and the capture engine corresponds to a capture engine of a second site. The method, at 420, includes identifying, by the capture engine, the update. The method, at 430, includes determining whether the update was committed to the database of the first site. The method, at 440, includes replicating, by an apply engine, the update to a database of the second site based on the determining. The update is replicated to the database of the second site based on a determination that the update was committed to the database of the first site. The committed update corresponds to a consistent replication of updates across two or more databases.

Figure 5:
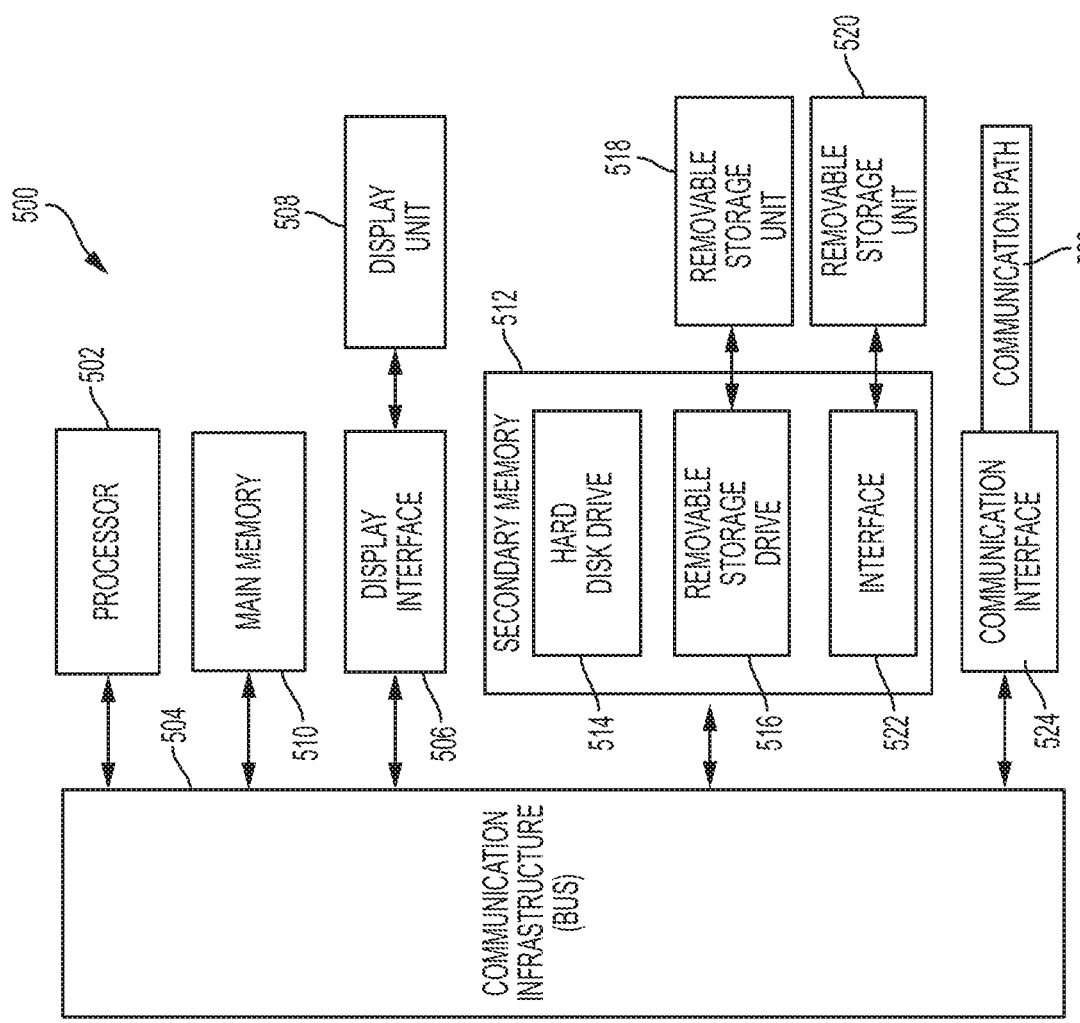
FIG. 5 depicts a high-level block diagram of a computer system, which can be used to implement one or more embodiments.

FIG. 5 depicts a high-level block diagram of a computer system 500, which can be used to implement one or more embodiments. Computer system 500 can correspond to, at least, a replication engine, a capture engine, an apply engine, and/or a DBMS device/module, for example. Computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512.

Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
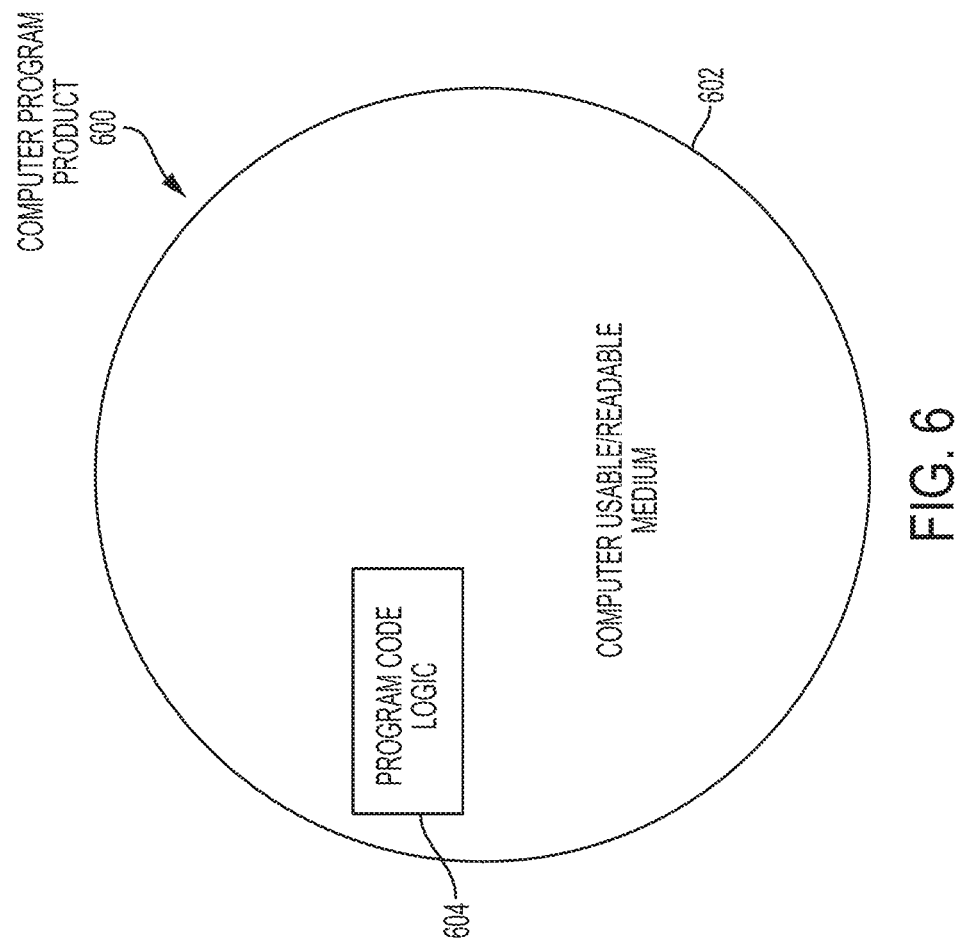
FIG. 6 depicts a computer program product, in accordance with one or more embodiments.

FIG. 6 depicts a computer program product 600, in accordance with an embodiment. Computer program product 600 includes a computer-readable storage medium 602 and program instructions 604.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
   reading, by a capture engine, log data, wherein the log data comprises a hardware-replicated set of log data, and the log data reflects that an update was started for a database of a first site, and wherein the capture engine corresponds to a capture engine of a second site, wherein the first site corresponds to an active site and the second site corresponds to a standby site;
   identifying, by the capture engine, the update by identifying a recovery token that corresponds to the update;
   determining whether the update was committed to the database of the first site, wherein the update uses a two-phase commit protocol process and the determination that the update was committed is determined based on detecting an end of the two-phase commit protocol process in the log data;
   replicating, by an apply engine, the update to a database of the second site based on the determining, wherein the update is replicated to the database of the second site based on a determination that the update was committed to the database of the first site, and the committed update corresponds to a consistent replication of updates across two or more databases,
   wherein replicating the update to the database of the second site corrects an inconsistency between the database of the first site and the database of the second site,
   wherein the apply engine and the capture engine are part of a replication engine that is implemented at the standby site; and
   communicating the identified recovery token to another replication engine.

2. The computer-implemented method of claim 1, wherein the log data comprises logs for one or more unique databases that are managed by different database management systems.

3. The computer-implemented method of claim 1, wherein the update for the database of the first site is performed by a global transaction.

4. A computer system comprising:
   a memory; and
   a processor system communicatively coupled to the memory;
   the processor system configured to perform a method comprising:
      reading log data, wherein the log data comprises a hardware-replicated set of log data, and the log data reflects that an update was started for a database of a first site, and wherein the processor system corresponds to a processor system of a second site, wherein the first site corresponds to an active site and the second site corresponds to a standby site;
      identifying the update by identifying a recovery token that corresponds to the update;
      determining whether the update was committed to the database of the first site, wherein the update uses a two-phase commit protocol process and the determination that the update was committed is determined based on detecting an end of the two-phase commit protocol process in the log data;
      replicating the update to a database of the second site based on the determining, wherein the update is replicated to the database of the second site based on a determination that the update was committed to the database of the first site, and the committed update corresponds to a consistent replication of updates across two or more databases, wherein replicating the update to the database of the second site corrects an inconsistency between the database of the first site and the database of the second site, wherein the apply engine and the capture engine are part of a replication engine that is implemented at the standby site; and communicating the identified recovery token to another replication engine.

5. The computer system of claim 4, wherein the log data comprises logs for one or more unique databases that are managed by different database management systems.

6. The computer system of claim 4, wherein the update for the database of the first site is performed by a global transaction.

7. A computer program product comprising:
a computer-readable storage medium having program instructions embodied therewith, wherein the computer-readable storage medium is not a transitory signal per se, the program instructions readable by a processor system to cause the processor system to perform a method comprising:
reading, by a capture engine, log data, wherein the log data comprises a hardware-replicated set of log data, and the log data reflects that an update was started for a database of a first site, and wherein the capture engine corresponds to a capture engine of a second site, wherein the first site corresponds to an active site and the second site corresponds to a standby site;

identifying, by the capture engine, the update by identifying a recovery token that corresponds to the update;

determining whether the update was committed to the database of the first site, wherein the update uses a two-phase commit protocol process and the determination that the update was committed is determined based on detecting an end of the two-phase commit protocol process in the log data;

replicating, by an apply engine, the update to a database of the second site based on the determining, wherein the update is replicated to the database of the second site based on a determination that the update was committed to the database of the first site, and the committed update corresponds to a consistent replication of updates across two or more databases, wherein replicating the update to the database of the second site corrects an inconsistency between the database of the first site and the database of the second site, wherein the apply engine and the capture engine are part of a replication engine that is implemented at the standby site; and communicating the identified recovery token to another replication engine.

8. The computer program product of claim 7, wherein the log data comprises logs for one or more unique databases that are managed by different database management systems.

* * * * *